United States Patent
Lee et al.

(10) Patent No.: US 7,228,481 B2
(45) Date of Patent: Jun. 5, 2007

(54) OPTICAL DISK AND METHOD OF RECORDING DATA TO THE SAME

(75) Inventors: Kyung-geun Lee, Gyeonggi-do (KR); In-sik Park, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 660 days.

(21) Appl. No.: 10/401,779

(22) Filed: Mar. 31, 2003

(65) Prior Publication Data

US 2004/0153943 A1 Aug. 5, 2004

(30) Foreign Application Priority Data

Mar. 29, 2002 (KR) ............................... 2002-17411
May 10, 2002 (KR) ............................... 2002-25950

(51) Int. Cl.
*H03M 13/00* (2006.01)
(52) U.S. Cl. .................. 714/746; 386/95; 714/799; 714/8; 714/54; 360/53
(58) Field of Classification Search ................. 714/710, 714/763, 8, 746, 799, 54; 386/95; 360/53
See application file for complete search history.

(56) References Cited

U.S. PATENT DOCUMENTS 6,288,990 B1 * 9/2001 Fujiie et al. ............. 369/47.21
6,314,235 B1 * 11/2001 Gotoh et al. .................. 386/95
6,385,744 B1 * 5/2002 Ando et al. .................... 714/54
6,658,593 B1 * 12/2003 Ko ................................. 714/8
6,922,802 B2 * 7/2005 Kim et al. ................... 714/723

FOREIGN PATENT DOCUMENTS

| EP | 0800172 | 10/1997 |
|----|---------|---------|
| EP | 997 900 | 5/2000 |
| EP | 1045391 | 10/2000 |
| EP | 1052639 | 11/2000 |
| KR | 2000-75374 | 12/2000 |
| KR | 2001-27954 | 4/2001 |
| KR | 2001-107398 | 12/2001 |

* cited by examiner

*Primary Examiner*—Albert Decady
*Assistant Examiner*—Esaw Abraham
(74) *Attorney, Agent, or Firm*—Stein, McEwen & Bui, LLP

(57) ABSTRACT

A method of recording data to an area including a defective ECC block of a DVD+RW, and an optical disk written in the recording method are provided. In the method, when data is recorded to an area including a defective ECC block, data recording ends at an ECC block right before the defective ECC block. Then, the data recording resumes from the last 8 channel bits of the ECC block immediately after the defective ECC block. Accordingly, recording/reproducing of data to/from an optical disk is consistently performed.

23 Claims, 12 Drawing Sheets

OPTICAL DISK AND METHOD OF RECORDING DATA TO THE SAME

CROSS-REFERENCE TO RELATED APPLICATIONS

This application claims the priority of Korean Patent Application No. 2002-17411, filed on Mar. 29, 2002, and Korean Patent Application No. 2002-25950, filed on May 10, 2002, in the Korean Intellectual Property Office, the disclosures of which are incorporated herein in their entirety by reference.

BACKGROUND OF THE INVENTION

1. Field of the Invention

The present invention relates to an optical disk and a method of recording data to the same, and more particularly, to a method of recording data to an area of a DVD+RW disk having a defective block, and an optical disk on which data is recorded using the recording method.

2. Description of the Related Art

Optical disks, which are optical information storage media, are widely used in optical pickup devices that record/reproduce information in a non-contact manner. Types of optical disks are compact discs (CD) and digital versatile discs (DVD), and high density DVDs (HD-DVD). Optical disks capable of recording, erasing, and reproducing data are a CD-R, a CD-RW, a DVD-RW, a DVD-RAM, a DVD+RW, or the like.

In DVD+RW disks, a basic recordable unit capable of recording a predetermined amount of data is called an error correction code (ECC) block. A method of recording data to several ECC blocks is shown in FIG. 1A. In the related art, when data is recorded sequentially, linking can be properly performed by using the last 8-channel bits 100-*a* of an ECC block before an N-th ECC block 102, where recording starts. Since linking may not start at an exact location due to an error in the number of rotations of a disk during recording, a spare area of ±5T is provided so that recording can start in the spare area. In other words, by providing the spare area of ±5T between an ideal recording start point and a real recording start point, if recording starts anywhere within the spare area, proper recording can be performed.

To follow the above-described linking system, the last 8-channel bits 104-*a* of the ECC block 104 remains unrecorded so that linking for consecutive recording is properly accomplished.

A conventional consecutive recording method based on the linking system is shown in FIG. 1B. Referring to FIG. 1B, data is recorded in an (N−1)th ECC block 100 excluding the last 8-channel bits 100-*a*. After the recording of the (N−1)th ECC block 100, while M ECC blocks starting from the N-th ECC block 102 are being recorded, linking occurs in the last 8 channel bits 100-*a* of the (N−1)th ECC block 100. Only the last 8 channel bits 104-*a* among the bits of the (N+M−1)th ECC block 100 are unrecorded.

FIG. 1C shows a case where data is recorded in a blank area to which data was not recorded. If an (N−2)th ECC block 110 right before a (N−1)th ECC block 112 where recording starts is a blank block to which data was not recorded, dummy data is recorded in the (N−1)th ECC block 112, and recording of user data starts from an N-th ECC block 114. Here, recording of the dummy data starts from the last 8 channel bits 110-*a* of the (N−2)th ECC block 110. The last 8-channel bits 116-*a* of a (N+M−1)th ECC block 116 where recording ends remain unrecorded.

In the related art, a method has been prescribed regarding how linking occurs in a case where consecutive recording is performed on a DVD+RW, while a method has not been prescribed regarding how a linking system is applied if a defective block is generated between ECC blocks where consecutive recording is being performed. Also, a method of consecutive recording and a method of recording data in a blank disk block are specified in the related art, while data overwriting to a disk where data has already been recorded has not been prescribed. Thus, there is a need to prescribe how linking occurs if a defective block is generated and how overwriting is performed.

SUMMARY OF THE INVENTION

The present invention provides a method of recording data in the case of overwriting of data to a DVD+RW, a method of recording data in the case of recording of data to an area including a defective area, and an optical disk to which data is recorded according to the recording method.

According to an aspect of the present invention, there is provided a method of recording data on an optical disk in the case of overwriting data to a recordable/reproducible optical disk, the method comprising performing linking by overlappingly recording data to the end portion of the ECC block right before an ECC block where the overwriting starts.

According to another aspect of the present invention, there is provided a method of recording data on an optical disk in the case of data recording to an area including a defective ECC block in a recordable/reproducible optical disk, the method comprising ending the data recording right before the defective ECC block.

In one implementation, data recording starts at the last 8 channel bits of the ECC block immediately after the defective ECC block.

In another implementation, data recording starts at the ECC block immediately after the defective ECC block.

According to another aspect of the present invention, a method of recording data to an area including a defective ECC block in a recordable/reproducible optical disk includes ending the data recording right before the last 8 channel bits of the ECC block right before the defective ECC block.

According to still another aspect of the present invention, a recordable/reproducible optical disk, in which overwriting of data to part of the optical disk where data has been recorded occurs, linking is performed by overlappingly recording data to the end portion of the ECC block immediately before an ECC block where the overwriting starts.

According to still another aspect of the present invention, a recordable/reproducible optical disk is provided wherein when data is recorded to an area including a defective ECC block, the data recording ends right before the defective ECC block and resumes from the last 8 channel bits of the ECC block immediately after the defective ECC block.

According to still another aspect of the present invention, a recordable/reproducible optical disk is provided wherein when data is recorded to an area including a defective ECC block, the data recording ends right before the defective ECC block and resumes from an ECC block immediately after the defective ECC block.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other features and advantages of the present invention will become more apparent by describing in detail exemplary embodiments thereof with reference to the attached drawings in which.

DETAILED DESCRIPTION OF THE PREFERRED EMBODIMENTS

Figure 1A:
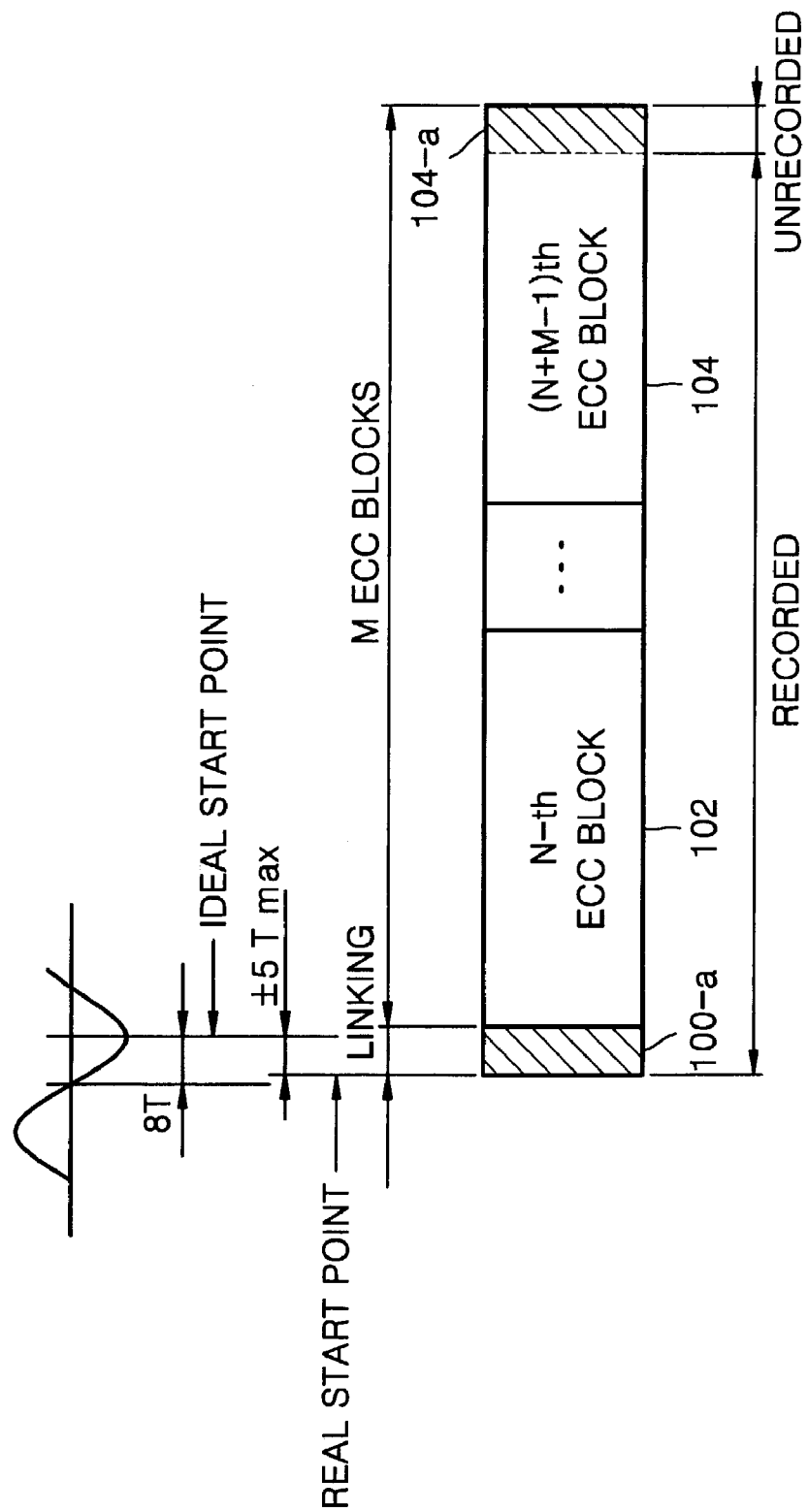
FIG. 1A illustrates a recording method performed in a conventional DVD+RW.
Figure 1B:
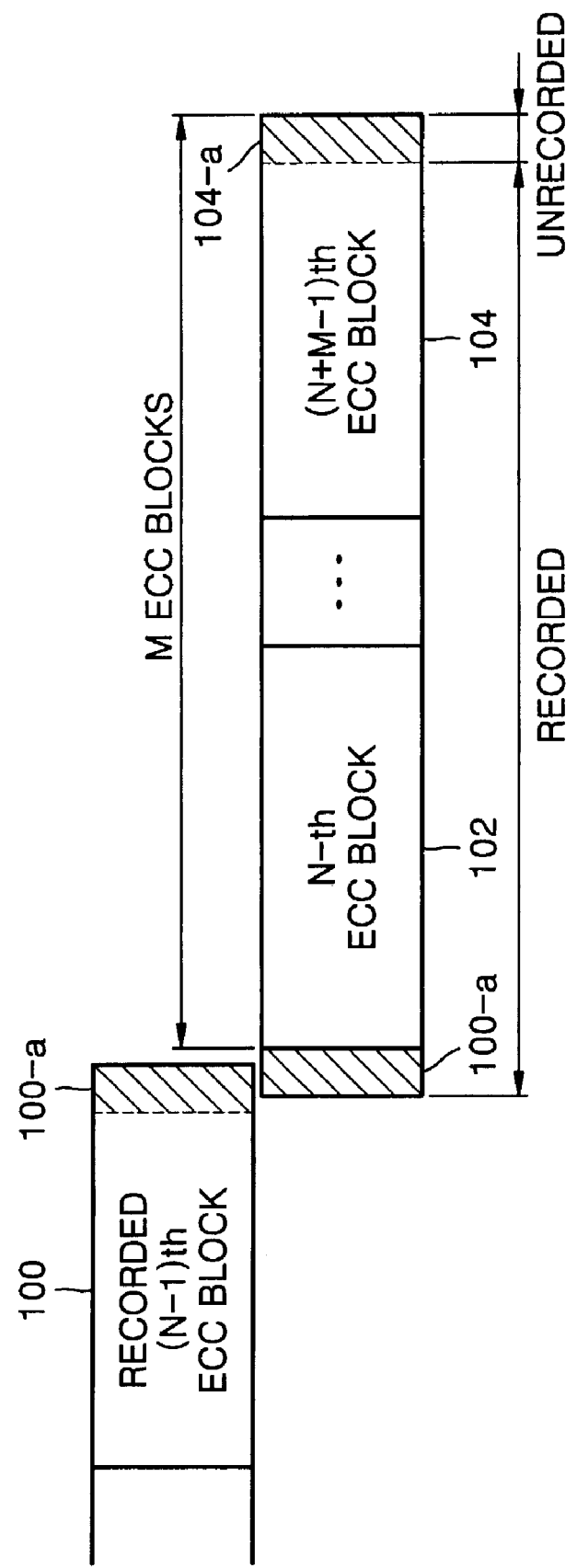
FIG. 1B illustrates the occurrence of linking upon consecutive recording in a conventional DVD+RW.
Figure 1C:
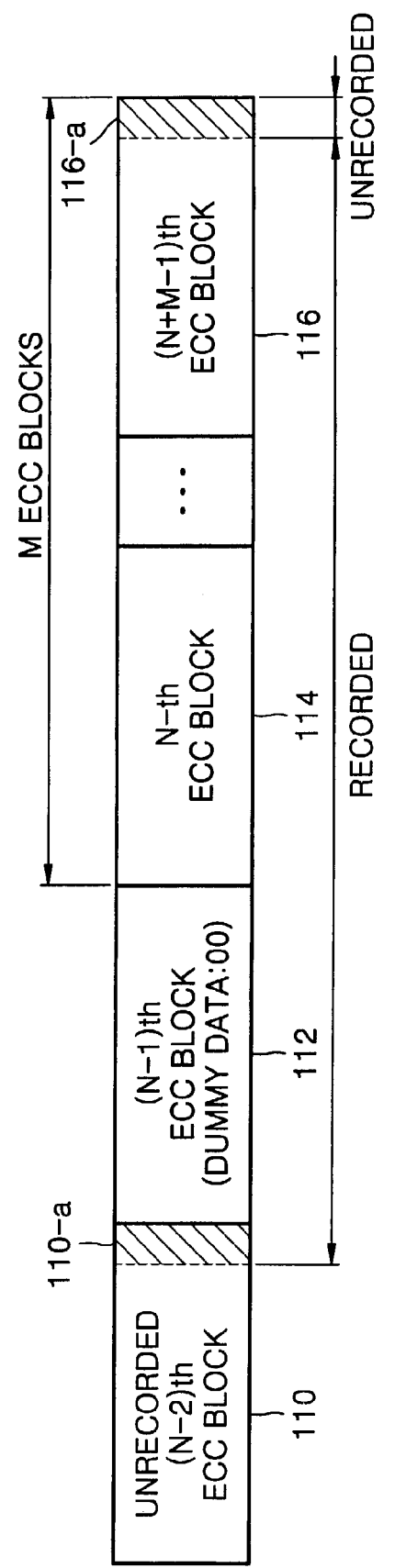
FIG. 1C illustrates the occurrence of linking when data is recorded in a blank area of a conventional DVD+RW.

Embodiments of the present invention are described in more detail below. Examples are illustrated in the accompanying drawings, which have like reference numerals that refer to like elements.

Figure 2:
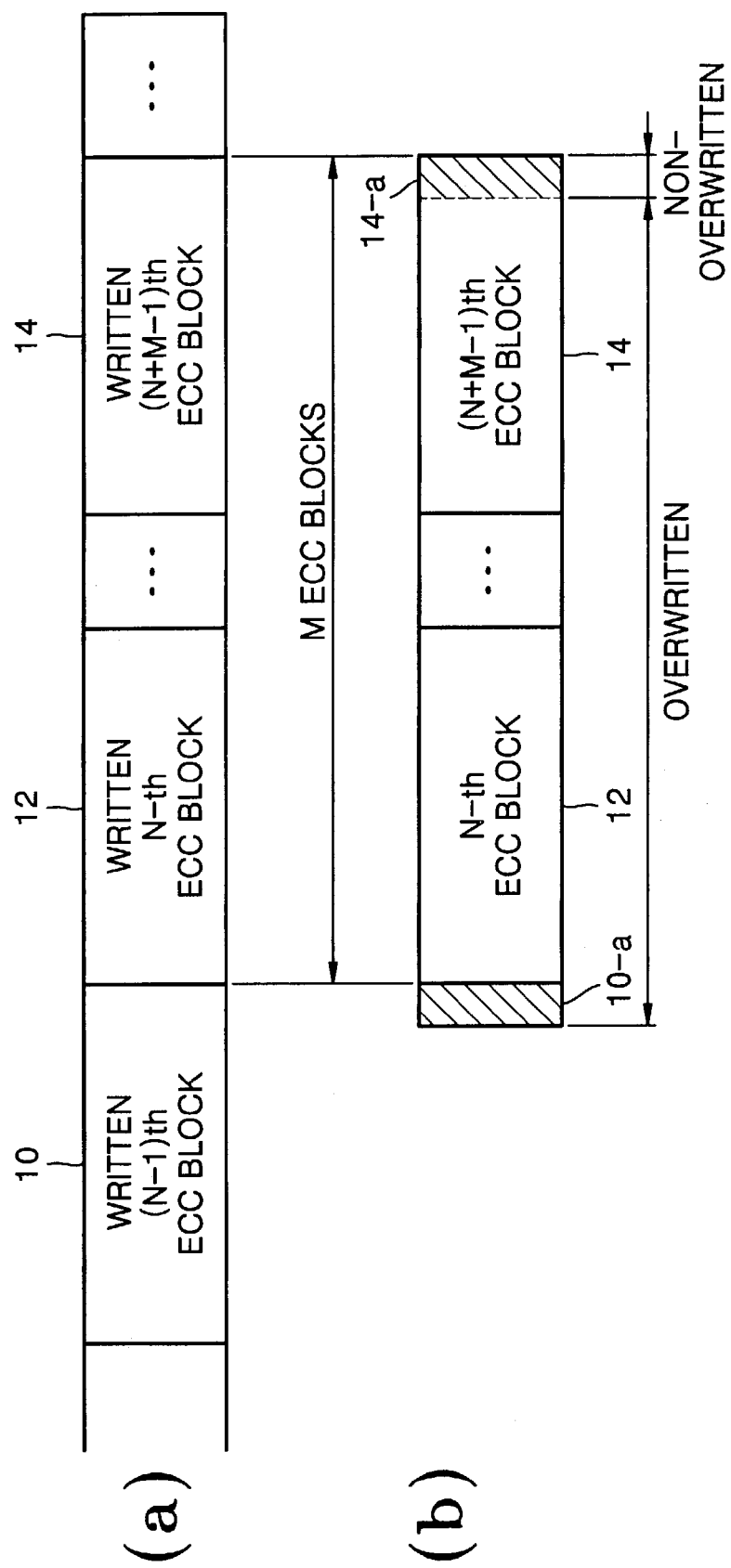
FIG. 2 illustrates an overwriting method based on a method of recording data to an optical disk, according to a first embodiment of the present invention.

Referring to FIG. 2, in an optical disk and a recording method for the optical disk according to a first embodiment of the present invention, data is overwritten from an N-th ECC block 12 among pre-written blocks, and data recording starts from the end portion of an (N−1)th ECC block 10 before the N-th ECC block 12. The end portion is an area where data has already been recorded, where linking occurs while data is being overlapped to be recorded. Data recording starts from the last 8 channel bits 10-*a* of the ECC block right before an ECC block where data recording is to start. In other words, if a disk has already been written, and some area of the disk, for example, M ECC blocks starting from the N-th ECC block 12, is to be overwritten, linking occurs between the previously recorded data in ECC block 10 and the newly recorded data in ECC block 12 in the last 8 channel bits 10-*a* of the (N−1)th ECC block 10 before the N-th ECC block 12.

Here, the last 8 channel bits 14-*a* of an (N+M−1)th ECC block 14 where overwriting ends are not overwritten. Thus, a spare linking area is created at 14-*a* that links the newly recorded data at ECC block 14 and previously recorded data after ECC block 14.

Figure 3A:
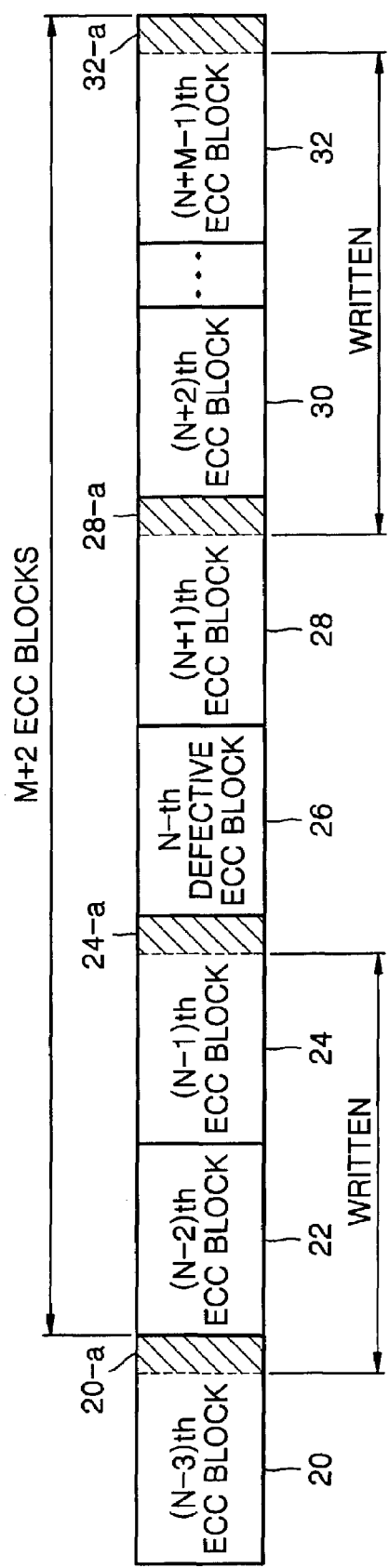
FIGS. 3A and 3B illustrate a method of recording data to an optical disk, according to a second embodiment of the present invention.

In an optical disk and a method of recording data in the optical disk, according to a second embodiment of the present invention, as shown in FIG. 3A, if recording is performed in an area including a defective ECC block 26, the recording ends before the last 8 channel bits 24-*a* of an ECC block 24 before the defective ECC block 26. In other words, when data is to be recorded in (M+2) blocks starting from an (N−2)th ECC block 22, if the defective N-th ECC block 26 is included, linking occurs in the last 8 channel bits 20-*a* of an (N−3)th ECC block 20 before the (N−2)th ECC block 22 in order to link ECC block 20 to ECC block 22.

Thereafter, data recording ends before the last 8 channel bits 24-*a* of the (N−1)th ECC block 24 before the N-th defective ECC block 26 and resumes from the last 8 channel bits 28-*a* of an (N+1)th ECC block 28 next to the N-th defective ECC block 26. Thus, linking areas 24-*a* and 28-*a* are used to link ECC block 24 to ECC block 30.

Figure 3B:
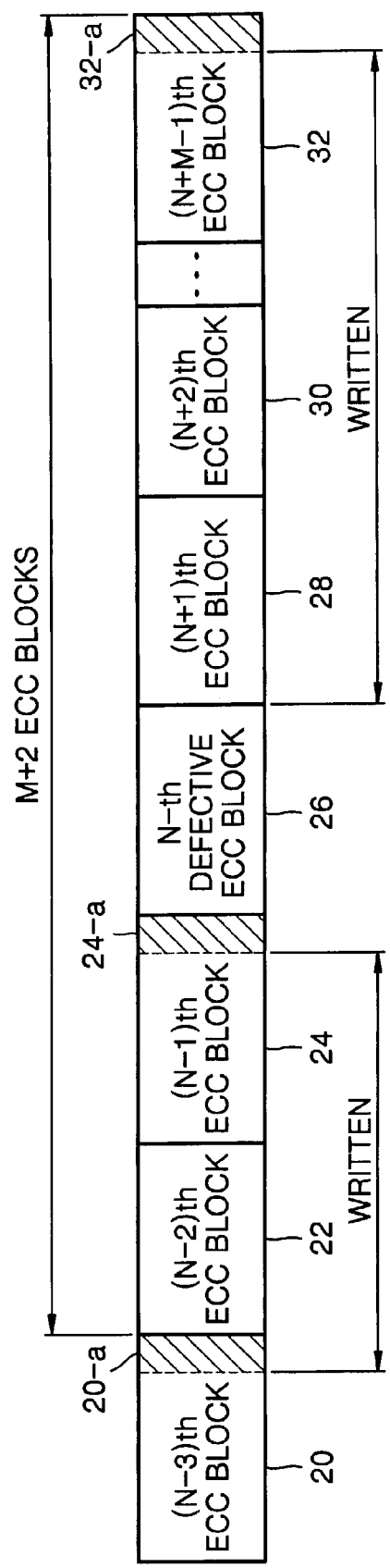

In the example of FIG. 3A, recording resumes from the last 8 channel bits 28-*a* of the (N+1)th ECC block 28 next to the defective ECC block 26. However, as shown in FIG. 3B, recording may resume from the beginning of the (N+1)th ECC block 28 next to the defective ECC block 26. Thus, a data area of 32 KB can be further secured.

Figure 4A:
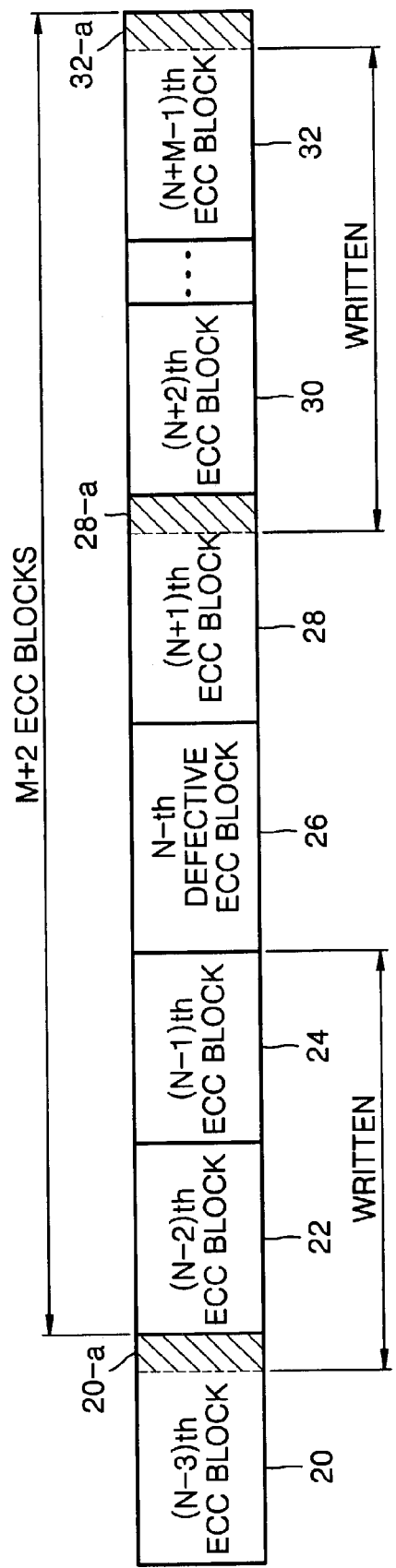
FIGS. 4A and 4B illustrate a method of recording data to an optical disk, according to a third embodiment of the present invention.

In an optical disk and a method of recording data in the optical disk, according to a third embodiment of the present invention, as shown in FIG. 4A, when (M+2) ECC blocks starting from the (N−2)th ECC block 22 are to be written, if they include the N-th defective ECC block 26, recording starts from the last 8 channel bits 20-*a* of the (N−3)th ECC block 20 before the (N−2)th ECC block 22. The recording ends before the N-th defective ECC block 26, since linking does not need to occur before a defective block, and accordingly, no spare area for linking is needed.

Thereafter, recording resumes from the last 8 channel bits 28-*a* of the (N+1)th ECC block 28 next to the N-th defective ECC block 26 and continues until the (N+M−1)th ECC block 32. At this time, the last 8 channel bits 32-*a* of the (N+M−1)th ECC block 32 remain unwritten, thereby reserving a linking area to link ECC block 32 to subsequently recorded data after ECC block 32.

Figure 4B:
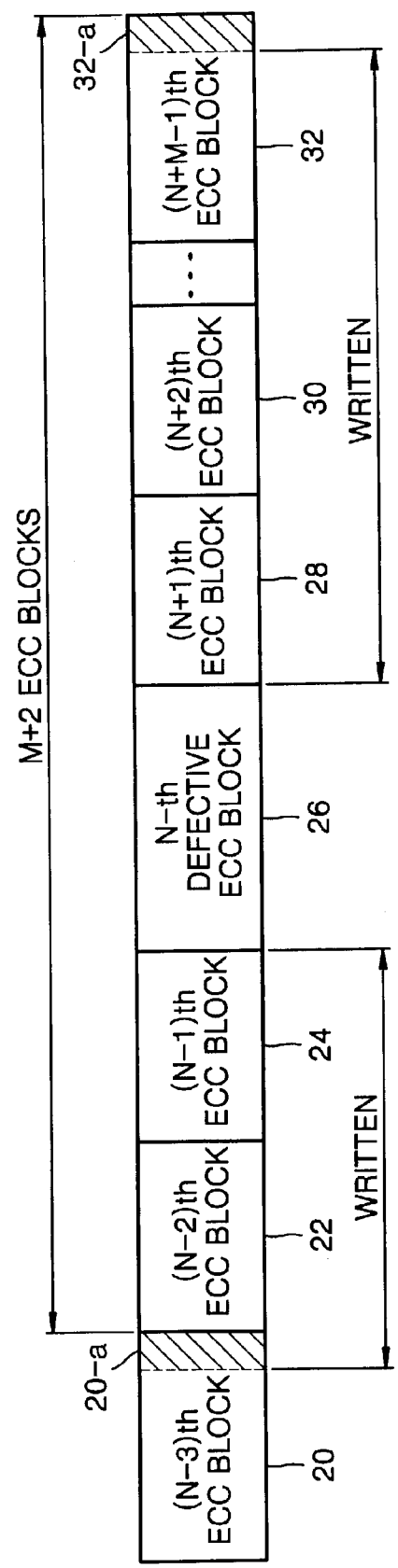

However, as shown in FIG. 4B, recording may resume from the beginning of the (N+1)th ECC block 28 next to the defective N-th ECC block 26. Accordingly, a data area of 32 KB can be further secured as compared to the recording method of FIG. 4A. After recording starts from the (N+1)th ECC block 28, the recording ends at the (N+M−1)th ECC block 32 while its last 8 channel bits 32-*a* remain unwritten.

The second and third embodiments can be applied to cases where recording is performed on a blank area of a DVD+RW, where consecutive data recording is performed, and where part of an area to which data has already been recorded is overwritten. Here, a defect may be generated before the start of recording or during recording. Also, the second and third embodiments according to the present invention are applicable to disks with a capacity of 4.7 GB.

An optical disk and a recording method for the optical disk according to a fourth embodiment of the present invention provides how a linking system works when the block before an area in which data is to be recorded is defective.

Figure 5A:
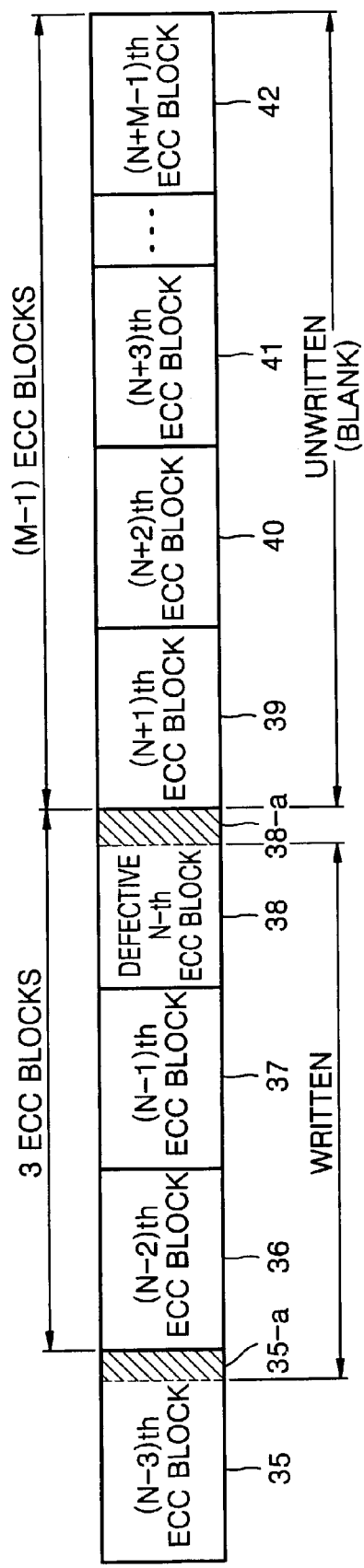
FIGS. 5A and 5B illustrate a method of recording data to an optical disk, according to a fourth embodiment of the present invention, is performed.
Figure 5B:
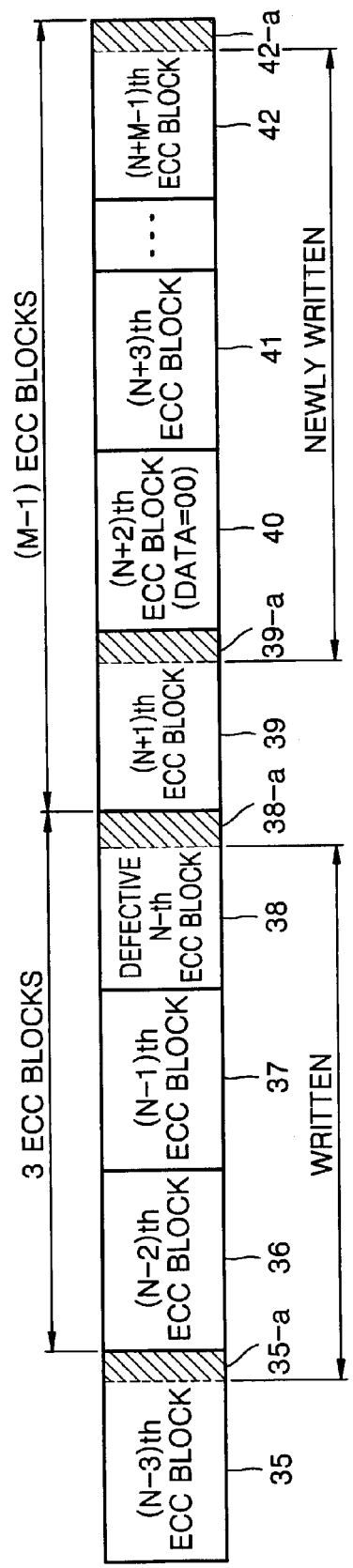

FIG. 5A shows an area of an optical disk on which a data recording according to the present invention is not yet performed, and FIG. 5B shows an area of an optical disk on which a data recording according to the present invention has been performed. Referring to FIG. 5A, as described above, some area of a user area, for example, an (N−2)th ECC block 36, an (N−1)th ECC block 37, and an N-th ECC block 38, has already been written, and linking occurs in the last 8 channel bits 35-*a* of an (N−3)th ECC block 35. Blocks from an (N+1)th ECC block 39 to an (N+M−1)th ECC block 42 remain unwritten, that is, blank. When recording is performed on (M−1) ECC blocks from the (N+1)th ECC block 39 to the (N+M−1)th ECC block 42, if the N-th ECC block 38 before the (N+1)th ECC block 39 where recording is to start is defective, the last 8 channel bits 38-*a* of the defective N-th ECC block 38 cannot be used for linking. Accordingly, an extra area for linking is required.

The extra area for linking is shown in FIG. 5B. User data cannot be recorded in the (N+1)th ECC block 39 next to the defective N-th ECC block 38, but data for linking is recorded in the last 8 channel bits 39-a of the (N+1)th ECC block 39. If the (N+1)th ECC block 39 before the (N+2)th ECC block 40 where recording starts is unwritten, that is, blank, dummy data is recorded in an (N+2)th ECC block 40 according to the above-described specification, and user data recording starts from an (N+3)th ECC block 41. The user data recording ends at the (N+M−1)th ECC block 42 while its last 8 channel bits 42-a remain unwritten so as to be used for linking.

Figure 6A:
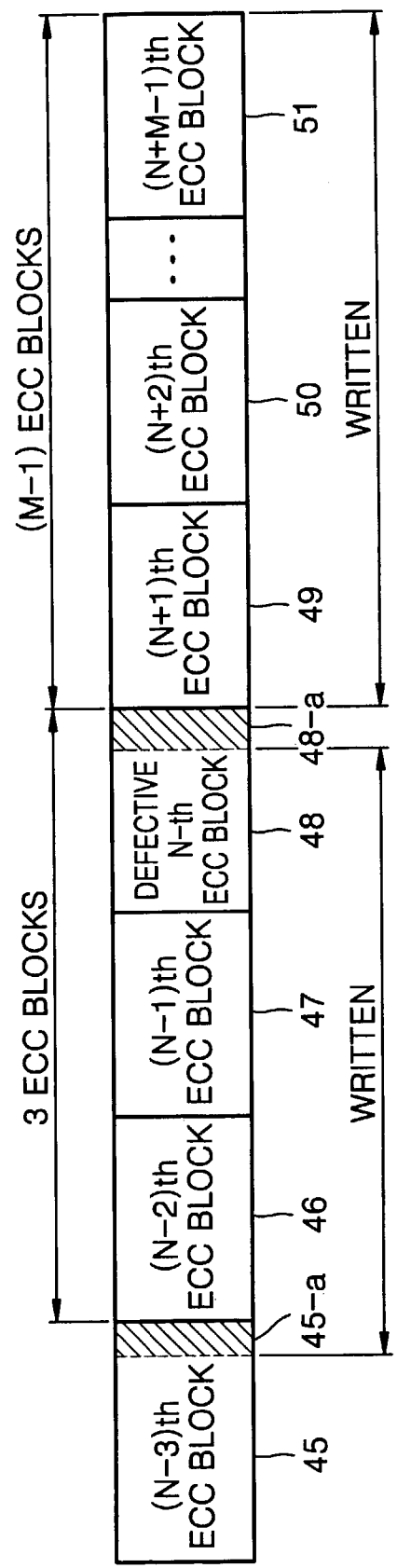
FIGS. 6A and 6B illustrate another data recording method that is performed according to the fourth embodiment of the present invention.
Figure 6B:
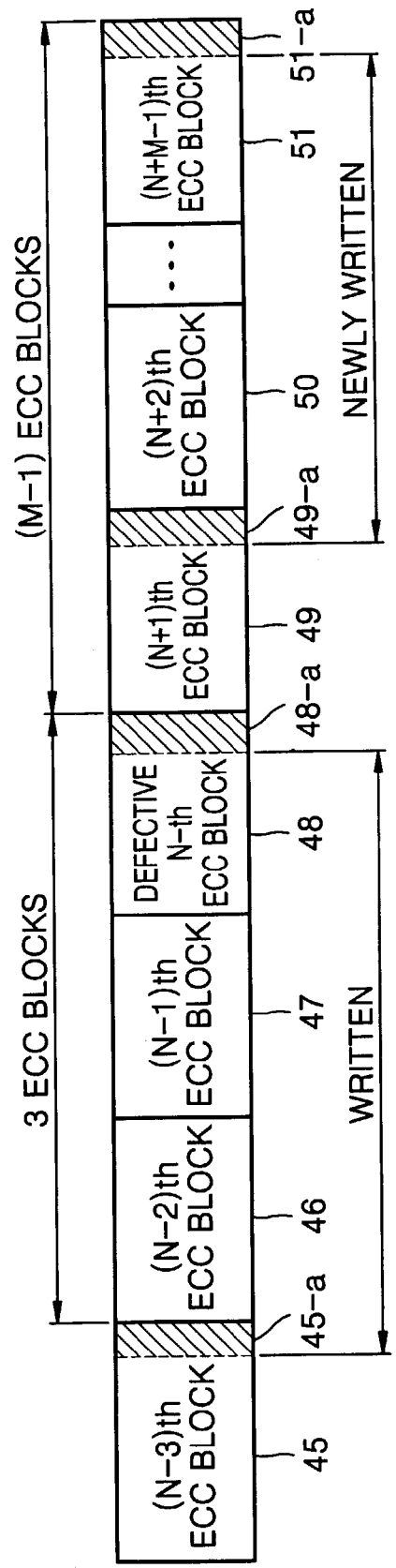

While FIG. 5A shows a case in which an area where data is to be recorded is unwritten, that is, blank, FIG. 6A shows a case where data is to be recorded where data has already been written. To be more specific, FIG. 6A shows an area of an optical disk in which a data recording according to the present invention is not yet performed, and FIG. 6B shows an area of an optical disk in which a data recording according to the present invention has already been performed.

As described above, (N−2)th, (N−1)th, and N-th ECC blocks 46, 47, and 48 have already been written, and linking occurs in the last 8 channel bits 45-a of an (N−3)th ECC block 45. When overwriting is performed on (M−1) ECC blocks from (N+1)th through (N+M−1)th ECC blocks 49 through 51 in which data has already been recorded, if an N-th ECC block 48 before the (N+1)th ECC block 49 where recording is to start is defective, the last 8 channel bits 48-a of the defective N-th ECC block 48 cannot be used for linking because of the defect.

Accordingly, data for linking is recorded on the (N+1)th ECC block 49 next to the defective N-th ECC block 48, more preferably, on the last 8 channel bits 49-a of the (N+1)th ECC block 49. Consequently, as shown in FIG. 6B, data recording starts from the last 8 channel bits 49-a of the (N+1)th ECC block 49 and ends at an (N+M−1)th ECC block 51 while its last 8 channel bits 51-a remain unwritten so as to be used for linking.

As described above, the method of recording data in the optical disk according to the fourth embodiment of the present invention proposes a data linking approach if the block before a block to be written is defective. The recording method according to the fourth embodiment is applicable to both a case where a block to be written is blank, that is, unwritten, and a case where the block to be written has already been written.

To sum up, an optical disk and a method of recording data to an optical disk according to the present invention propose a method of processing a defective block to accomplish the compatibility of a DVD+RW disk with a disk drive. To be more specific, the present invention provides an overwriting method not prescribed in the related art, a method of recording data in a predetermined area including a defective area, and a method of performing linking when the block before a block to be written is defective. Thus, data recorded on or retrieved from an optical disk is consistently recorded/reproduced.

Although a few preferred embodiments of the present invention have been shown and described, those skilled in the art will appreciate that changes may be made in these embodiments without departing from the principles and spirit of the invention, the scope of which is defined in the claims and their equivalents.

What is claimed is:

1. A method of recording data in a recordable/reproducible optical disk having an area including a defective first ECC block, the method comprising:
    ending the data recording right before the defective first ECC block;
    overwriting data to the recordable/reproducible optical disk starting at a second ECC block;
    performing linking by overlappingly recording data to an end portion of a third ECC block right before the second ECC block where the overwriting starts.

2. The method of 1, wherein the linking is performed in a last 8 channel bits of the third ECC block.

3. A method of recording data in a recordable/reproducible optical disk, in an area including a defective first ECC block, the method comprising:
    ending the data recording right before the last 8 channel bits of a second ECC block right before the defective first ECC block;
    overwriting data beginning at a third ECC block of the recordable/reproducible optical disk;
    performing linking by overlappingly recording data to an end portion of a fourth ECC block right before the third ECC block where the overwriting starts.

4. The method of claim 3, wherein the linking is performed in a last 8 channel bits of the fourth ECC block.

5. A method of recording data in a recordable/reproducible optical disk having a defective first ECC block, the method comprising:
    recording data linking to an end portion of a second ECC block immediately after the defective first ECC block; and
    recording dummy data in a third ECC block one ECC block after the defective ECC block.

6. The method of claim 5, wherein the data for linking is recorded in a last 8 channel bits of the second ECC block immediately after the defective first ECC block.

7. The method of claim 5, wherein the third ECC block where data is to be recorded has already been written, and the written third ECC block is overwritten.

8. The method of claim 5, wherein the third ECC block where data is to be recorded is a blank block where no data has been recorded.

9. A recordable/reproducible optical disk, comprising:
    a data recording area that includes ECC blocks;
    wherein if the data recording area includes a defective first one of the ECC blocks, the data recording ends right before the defective first ECC block and resumes from a last 8 channel bits of a second one of the ECC blocks immediately after the defective first ECC block.

10. The recordable/reproducible optical disk of claim 9, wherein if there is overwriting of data to the recordable/reproducible optical disk, linking is performed by overlappingly recording data to an end portion of a third one of the ECC blocks right before a fourth one of the ECC blocks where the overwriting starts.

11. The recordable/reproducible optical disk of claim 10, wherein the linking is performed in a last 8 channel bits of the third ECC block.

12. A recordable/reproducible optical disk, comprising:
    a data recording area that includes ECC blocks;
    wherein:
        if the data recording area includes a defective first one of the ECC blocks, the data recording ends right before the defective first ECC block and resumes from a second one of the ECC blocks immediately after the defective first ECC block, and if there is overwriting of data to the recordable/reproducible optical disk, linking is performed by overlappingly recording data to an end portion of a third one of the ECC blocks right before a fourth one of the ECC blocks where the overwriting starts.

13. The recordable/reproducible optical disk of claim 12, wherein the linking is performed in a last 8 channel bits of the third one of the ECC blocks.

14. A recordable/reproducible optical disk, comprising:
a data recording area comprising first, second and third sequential ECC blocks;
wherein if the second ECC block is defective, recorded data ends immediately before a last 8 channel bits of the first ECC block and resumes from a last 8 channel bits of the third ECC block.

15. The recordable/reproducible optical disk of claim 14, wherein if there is overwriting of data to the recordable/reproducible optical disk, linking is performed by overlappingly recording data to an end portion of a fourth one of the ECC blocks right before a fifth one of the ECC blocks where the overwriting starts.

16. The recordable/reproducible optical disk of claim 15, wherein the linking is performed in a last 8 channel bits of the fourth ECC block.

17. A recordable/reproducible optical disk, comprising:
a data recording area comprising first, second and third sequential ECC blocks;
wherein if the second ECC block is defective, data recording ends immediately before a last 8 channel bits of the first ECC block and resumes from the third ECC block.

18. The recordable/reproducible optical disk of claim 17, wherein if there is overwriting of data to the recordable/reproducible optical disk, linking is performed by overlappingly recording data to an end portion of a fourth one of the ECC blocks right before a fifth one of the ECC blocks where the overwriting starts.

19. The recordable/reproducible optical disk of claim 18, wherein the linking is performed in a last 8 channel bits of the fourth ECC block.

20. A recordable/reproducible optical disk, comprising:
ECC blocks;
wherein;
if a first one of the ECC blocks before a second one of the ECC blocks where data is to be recorded is defective, data for linking is recorded to an end portion of the second ECC block immediately after the defective first ECC block, and
dummy data is recorded in a third one of the ECC blocks one block after the defective ECC block.

21. The recordable/reproducible optical disk of claim 20, wherein the data for linking is recorded in a last 8 channel bits of the second ECC block immediately after the defective ECC block.

22. The recordable/reproducible optical disk of claim 20, wherein the second ECC block where data is to be recorded has already been written, and the written second ECC block is overwritten.

23. The recordable/reproducible optical disk of claim 20, wherein the second ECC block where data is to be recorded is a blank block where no data has been recorded.

* * * * *